US009939271B1

(12) United States Patent
Foster et al.

(10) Patent No.: US 9,939,271 B1
(45) Date of Patent: Apr. 10, 2018

(54) ENROUTE DISTANCE MEASURING TOOL (71) Applicant: The Boeing Company, Chicago, IL (US)

(72) Inventors: Susan A. Foster, Centennial, CO (US); Jeffrey J. Buhl, Littleton, CO (US); Jeffrey L. Williams, Parker, CO (US); Aaron D. Pilcher, Denver, CO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/034,272

(22) Filed: Sep. 23, 2013

(51) Int. Cl.
*G01C 21/00* (2006.01)
*G06F 3/0484* (2013.01)
*G06F 3/0485* (2013.01)

(52) U.S. Cl.
CPC ........... *G01C 21/00* (2013.01); *G06F 3/0484* (2013.01)

(58) Field of Classification Search
None
See application file for complete search history.

(56) References Cited

U.S. PATENT DOCUMENTS

| | | | | |
|---|---|---|---|---|
| 6,175,801 B1 * | 1/2001 | Millington | ......... | G01C 21/3664 701/428 |
| 6,957,130 B1 * | 10/2005 | Horvath et al. | ................... | 701/3 |
| 7,765,061 B1 * | 7/2010 | Barber et al. | ................... | 701/467 |
| 7,772,992 B2 * | 8/2010 | Fetzmann et al. | ............ | 340/961 |
| 7,876,238 B2 * | 1/2011 | Vandenbergh et al. | ....... | 340/971 |
| 8,843,306 B1 * | 9/2014 | Spackman et al. | ........... | 701/409 |
| 2004/0201596 A1 * | 10/2004 | Coldefy | ............... | G08G 5/0013 345/660 |
| 2007/0085707 A1 * | 4/2007 | Wyatt | ........................... | 340/979 |
| 2008/0147315 A1 * | 6/2008 | Fetzmann et al. | ............ | 701/207 |
| 2008/0186207 A1 * | 8/2008 | Fetzmann et al. | ............ | 340/972 |
| 2008/0262664 A1 * | 10/2008 | Schnell et al. | ................... | 701/4 |
| 2008/0275642 A1 * | 11/2008 | Clark et al. | ...................... | 701/208 |
| 2010/0017123 A1 * | 1/2010 | Droops et al. | ................. | 701/212 |
| 2011/0298648 A1 * | 12/2011 | Ferro | ............................... | 342/29 |
| 2012/0001773 A1 * | 1/2012 | Lyons et al. | .................. | 340/970 |
| 2012/0010763 A1 * | 1/2012 | Goodman et al. | ................. | 701/2 |
| 2013/0009792 A1 * | 1/2013 | Shafaat | ........................ | 340/979 |
| 2013/0204523 A1 * | 8/2013 | He et al. | ........................ | 701/527 |
| 2014/0033107 A1 * | 1/2014 | Le Roux | ........................ | 715/771 |
| 2014/0067162 A1 * | 3/2014 | Paulsen et al. | .................... | 701/2 |
| 2014/0142789 A1 * | 5/2014 | Baloche et al. | .................. | 701/3 |

* cited by examiner

*Primary Examiner* — Navid Ziaeianmehdizadeh

(74) *Attorney, Agent, or Firm* — Gates & Cooper LLP (57) ABSTRACT

Electronic map display information is generated. A map display comprising mapping data for a geographic region is generated. The mapping data is rendered on a map display. A plurality of concentric rings are overlaid on the map display. Each of the rings are indicative of a scaling factor for the mapping data. The scaling factor is adjusted based in a context of the map display.

19 Claims, 6 Drawing Sheets

ENROUTE DISTANCE MEASURING TOOL

BACKGROUND

Pilots need to determine the location of their aircraft relative to storms and other weather events, regulated airspace, and diversion airports. When flying in non-radar environments, or in the event of a failure of navigation equipment, pilots may also need to determine distance and direction to waypoints and navaids. One way to do this is for pilots to interact with a mapping device and correlate features on the mapping device to determine location of the aircraft and distance and direction to various objects. Such a mapping device may include an electronic flight bag (EFB) or other device that may host mapping data.

SUMMARY

Illustrative examples of the present disclosure include, without limitation, a method, device, and computer-readable storage medium. In one aspect, a method for presenting electronic map display information pertaining to an aircraft is described. A map display comprising mapping data for a geographic region is generated. A position of the aircraft is indicated on the map display. A plurality of concentric rings is rendered on the map display, each of the rings indicative of a scaling factor for the mapping data. The concentric rings are adjusted based on a context of the map display.

In another aspect, a device configured to render electronic map display information is provided. The device may include a processor and memory. A map display comprising mapping data for a geographic region is generated. A plurality of concentric rings is rendered on the map display, each of the rings indicative of a scaling factor for the mapping data. The scaling factor is adjusted based on a context of the map display.

In another aspect, a non-transitory computer-readable storage medium is provided. A map display comprising mapping data for a geographic region is generated. A plurality of concentric rings is rendered on the map display, each of the rings indicative of a scaling factor for the mapping data. The scaling factor is adjusted based on a context of the map display.

Other features of the disclosure are described below. The features, functions, and advantages that have been discussed can be achieved independently in various examples or may be combined in yet other examples, further details of which can be seen with reference to the following description and drawings.

BRIEF DESCRIPTION OF DRAWINGS

Examples of techniques in accordance with the present disclosure are described in detail below with reference to the following illustrations.

DETAILED DESCRIPTION

It is important for aircraft pilots to determine the location of their aircraft relative to significant points such as storms and other weather events, regulated airspace, and diversion airports. When flying in non-radar environments or in cases where the aircraft avionics (e.g., the Flight Management Computer) have failed, pilots may also need to determine the distance and direction to waypoints and navigation aids (i.e., a device or system that provides navigational data, also referred to as navaids). In order to measure distance and direction to one or more points or objects, current electronic charting solutions typically use a linear scale mimicking the scale drawn on paper enroute charts. One problem with this method is that the scale is displayed along the edge of the map, requiring more interaction with the mapping device to correlate various features distributed across the map. In one variation to this approach, a capability may be provided to touch two points on the display to dynamically draw a linear scale. This approach may solve the problem of measuring between two points at odd angles. However, the user interaction may cause the pilot's hands to obscure the map and scale. The interaction may also require significant heads down time.

Pilots can also use the Flight Management Computer (FMC) or other avionics devices to determine distance to an object. However, in order to calculate the time to the objects, these solutions require the pilot to convert distance to time manually and to do so for each destination of interest. Furthermore, many devices display flight information region (FIR) boundaries. In many cases pilots may need to go through the steps of finding the fix at a FIR boundary crossing for which there is a 10 minute prior reporting requirement. The pilot would need to determine the ground speed of the aircraft, convert the ground speed to distance, and calculate the distance to the fix to estimate the 10 minute mark. This typically requires significant heads down time.

In various examples described in this disclosure, an enroute distance measuring tool is described that addresses the shortcomings of the above approaches. The enroute distance measuring tool may provide complementary capabilities to limit the pilot's workload, reduce error, and increase situational awareness. The enroute distance measuring tool may allow a pilot or other user to obtain at-a-glance measurements to multiple objects without interaction from the pilot or user. Accordingly, the enroute distance measuring tool may provide an alternative to the use of linear scales that require significant pilot interaction and can typically allow measurement to only one object at a time. In some implementations, the enroute distance measuring tool may provide distance measuring rings that stand out from other objects that are displayed on the enroute map. In this way, the pilot or user may glance at and quickly ascertain distance information. Measurements can be displayed in nautical miles, kilometers, time intervals, or any other useful unit of measurement.

Figure 1:
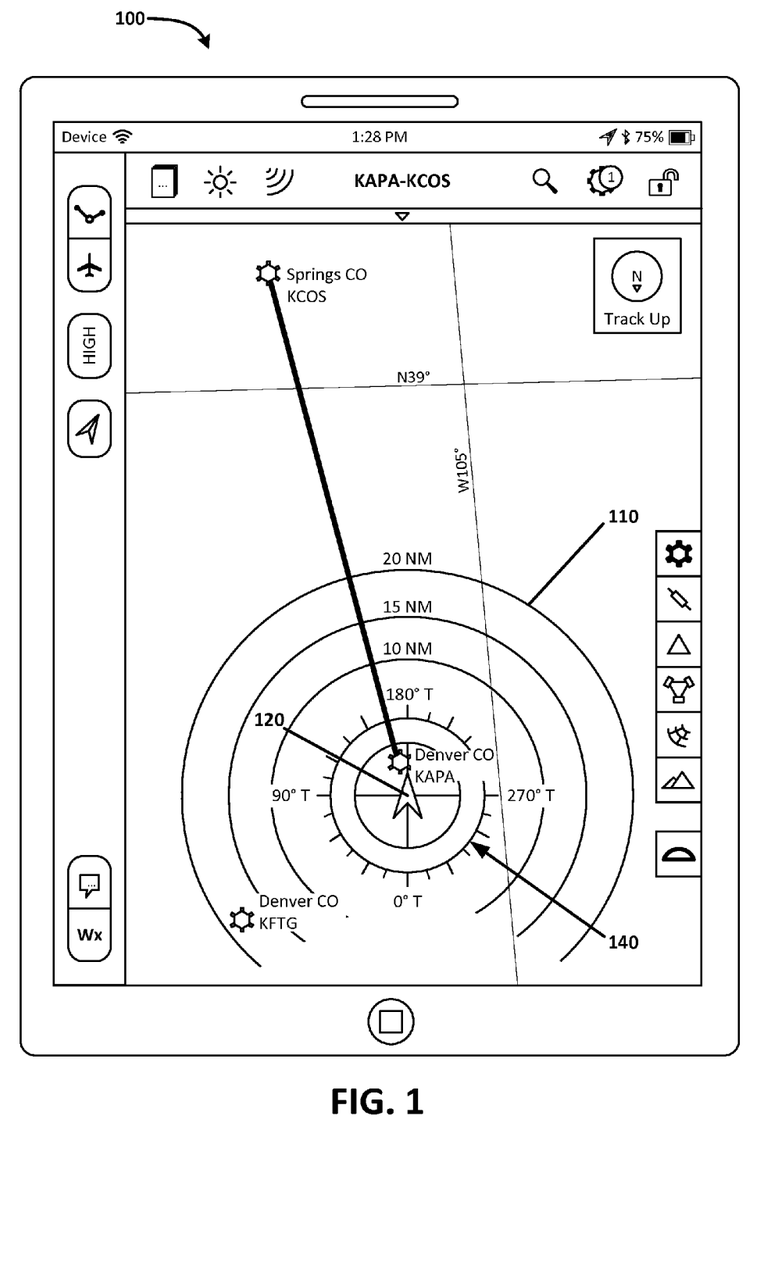
FIG. 1 depicts an example user interface that may be used in conjunction with presenting electronic map display information.

FIG. 1 illustrates an example map display 100 of an enroute distance measuring tool in accordance with this disclosure. FIG. 1 depicts range rings 110 (may also be referred to as distance measuring rings) with ownship 120 centered on the reference point. The distance measuring rings 110 may indicate distances to features across the displayed chart. In some implementations, the distance measuring rings 110 may comprise equally spaced rings or arcs that can be toggled on and off to avoid cluttering the map when the rings or arcs not needed. Furthermore, the rings or arcs may be displayed differently depending whether the map is in a North up or Track up orientation. The ranges may be depicted in a variety of increments. In one example, the ranges may include 0.1, 0.2, 0.5, 1, 2, 5, 10, 20, 50, 100, 200, and 500 nautical miles (NM) or intervals of time based on ground speed.

As the map on the enroute distance measuring tool is zoomed in and out, the rings may be configured to automatically change with the map scale up to the point where the rings do not fit on the screen. The depicted ranges may then be redrawn so as to depict the next interval. In some implementations, the enroute distance measuring tool may implement a ship offset indicator. The ship offset indicator may be configured such that when the map is panned over an object of interest, the ship offset indicator points back to the direction of the aircraft's position. The ship offset indicator may allow the pilot to obtain dynamically updated feedback of distance (or time) and direction to important features on the map.

As discussed above, in many cases pilots need to go through the steps of finding the fix at a FIR boundary crossing for which there is a 10 minute prior reporting requirement. For pilots operating under conditions that prevent the display of ownship, map centering features may be used to temporarily orient the pilot to the aircraft position.

In some implementations, the enroute distance measuring tool may be accessible to the pilot via a display device or other information tool. For example, the enroute distance measuring tool may be accessed from the main display of an electronic flight bag (EFB). The EFB may be an electronic information device that can be used by flight crews to perform flight management tasks and provide electronic displays that can replace paper-based reference material such as the aircraft operating manual, flight-crew operating manual, and navigational charts. The EFB may also be used to host software applications. While the present disclosure describes examples of the enroute distance measuring tool hosted on an EFB, it should be understood that the features described herein may be implemented on other devices and platforms. Further details will now be described.

When the enroute distance measuring tool is turned on, the EFB may display distance measuring rings, a reference point, and in some implementations a ship offset indicator. FIG. 1 illustrates an example map display 100 of an enroute distance measuring tool in accordance with this disclosure. FIG. 1 depicts range rings 110 in track up orientation (discussed further below) with ownship 120 centered on the reference point. The distance measuring rings 110 may indicate distances to features across the displayed chart. The depiction of the distance measuring rings 110 may be such that the rings are distinguishable from other map elements (e.g., air space, route lines, flight information region (FIR)/ upper flight information region (UIR) boundaries, Next-Generation Radar (NEXRAD), Winds Aloft, Significant Meteorological Information (SIGMET), terrain, etc.). To allow for further visual distinction, the rings may be rendered using a combination of contrasting light and dark shadows to allow for greater contrast between rings.

The innermost center ring 140 may be a compass rose that may include incremental markings of azimuth that can be used to determine direction. The centermost ring may be larger than the ownship size, providing a non-precise visual cue of aircraft position. Each ring or arc may be labeled with the range that the ring or arc represents from a central reference point within the chart. As the pilot or user zooms the map display in and out, the rings may be configured to change with the map scale to provide constant feedback of distance and direction regardless of the depicted map scale. Additionally, the rings may be updated automatically as the position and altitude of the aircraft changes. In some implementations, the pilot/user may be able to move the map to view other geographic areas and the rings may remain in place unless the pilot/user also changes the scaling of the map. In one implementation, the enroute distance measuring tool may be hosted on a device with a touchscreen capability, allowing for the pilot/user to directly select objects on the screen and zoom in and out. Thus the rings and the underlying map may be moved relative to one another, allowing for greater flexibility for determining relative distances between objects on the map.

In some implementations, a North Up orientation may be provided on the enroute distance measuring tool. In the North Up orientation, the rings may be centered on a point in the middle of the map window and the map may be shown with a north up orientation. In this implementation, the reference point may be referred to as the North Up Reference Point. In some implementations, a Track Up orientation may be provided on the enroute distance measuring tool where the up position of the map corresponds to the current direction of the aircraft. In the Track Up orientation, the arcs may be centered on a point that bisects the mid-point of the horizontal axis. In the Track Up orientation, the compass rose may rotate with the map, and to maintain readability, the compass may incrementally update its vertical orientation during rotation. Additionally, in some implementations the arcs may be centered on a point that bisects the mid-point of the horizontal axis and 25% from the bottom edge of the map on the vertical axis.

In some implementations, when the enroute distance measuring tool display is configured to move with the movement of the aircraft, the map may be drawn such that the aircraft's present position (PPOS) is continuously located at the Reference Point of the current orientation.

In one implementation, a Ship Offset Indicator may be provided by the enroute distance measuring tool. The Ship Offset Indicator may be a symbol that appears at the map's Reference Point when the pilot/user moves the map and the map is no longer centered on the aircraft's present position. When the map is panned over an object of interest, the Ship Offset Indicator may be configured to point back to the direction of the aircraft's position. Providing this at-a-glance feedback can allow the pilot to easily and dynamically keep track of the aircraft's position, distance, and/or time relative to objects of interest on the map. The depiction may be provided so as to be visually distinct from ownship and other enroute objects, making it easier to see that the map is no longer centered on the ship's present position. In some implementations, the PPOS (present position) may be presented on the display as a soft button that, when activated by the pilot or user or by some other means, returns the ownship to the Reference Point, replacing the Ship Offset Indicator.

In some implementations, the enroute distance measuring tool may allow the pilot/user the option of adding additional sets of concentric rings. By using multiple sets of rings, the pilot/user may be able to determine the aircraft location relative to objects of interest in various combinations. The pilot/user may also be provided the option of removing all rings from the display.

By displaying a series of rings and the ship offset indicator, the enroute distance measuring tool can allow a pilot to measure distance and direction to multiple objects simply by viewing the display and without further interactions or calculations. In some cases, once a pilot determines the aircraft location relative to one or more objects of interest, a conversion from distance to time is often desired. Distance measurement can be performed using units of time as well as other units of measure such as nautical miles and kilometers. For example, a pilot may measure distance to a mandatory reporting point and then calculate the time until the communication is required. In some examples, the unit of measurement can be switched to time (when ground speed is known), or kilometers. By changing the unit of measurement on the distance measuring rings and the ship offset indicator, the pilot may be able to quickly view the estimated time of arrival (ETA). A similar capability may be implemented for converting nautical miles to kilometers.

In some cases, regulatory concerns over the potential use of aeronautical charting solutions for aircraft navigation purposes may inhibit pilots from displaying the precise aircraft position on the enroute map. In such cases, pilots may have to increase heads-down time in order to determine the aircraft's position on the chart before performing any further analysis. When centered on an aircraft's present position, the enroute distance measuring tool can provide pilots with situational awareness without showing the precise location of the aircraft.

Figure 2:
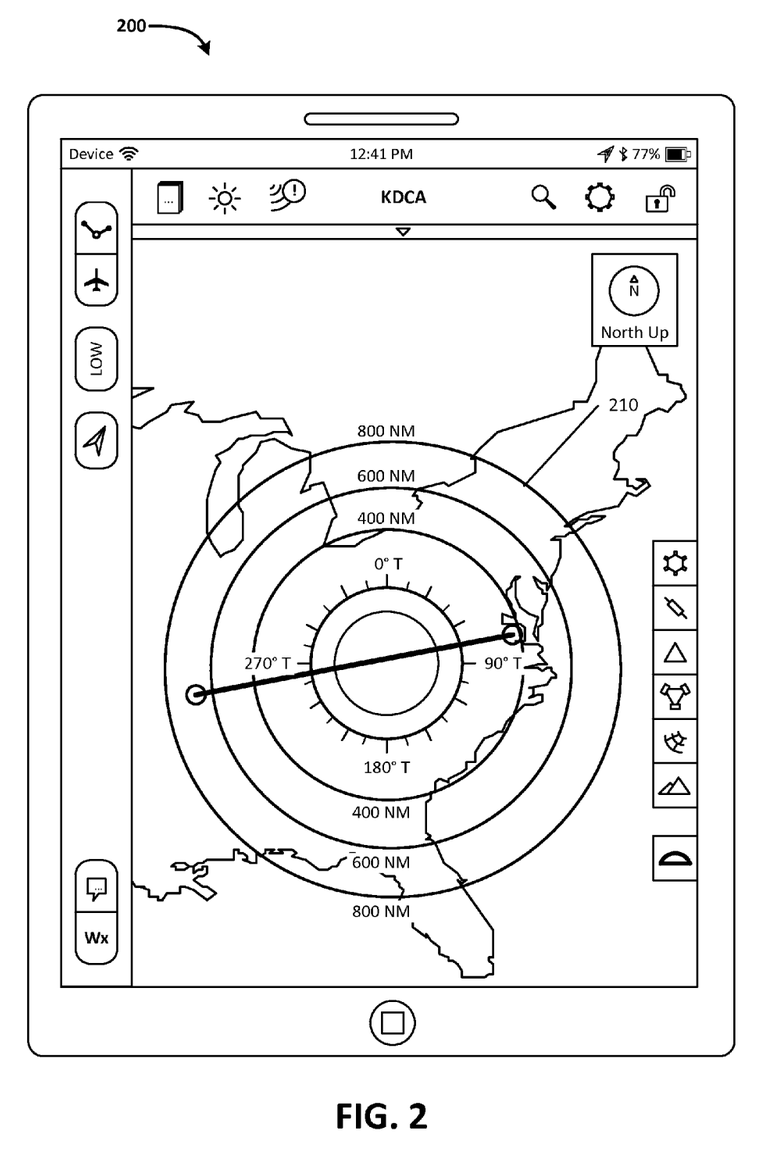
FIG. 2 depicts an example user interface that may be used in conjunction with presenting electronic map display information.

FIG. 2 illustrates an example map display 200 of an enroute distance measuring tool in accordance with this disclosure. FIG. 2 depicts range rings 210 in north up orientation with ownship configured OFF. As shown in the figure, the rings are centered on a point near the middle of the map window.

Figure 3:
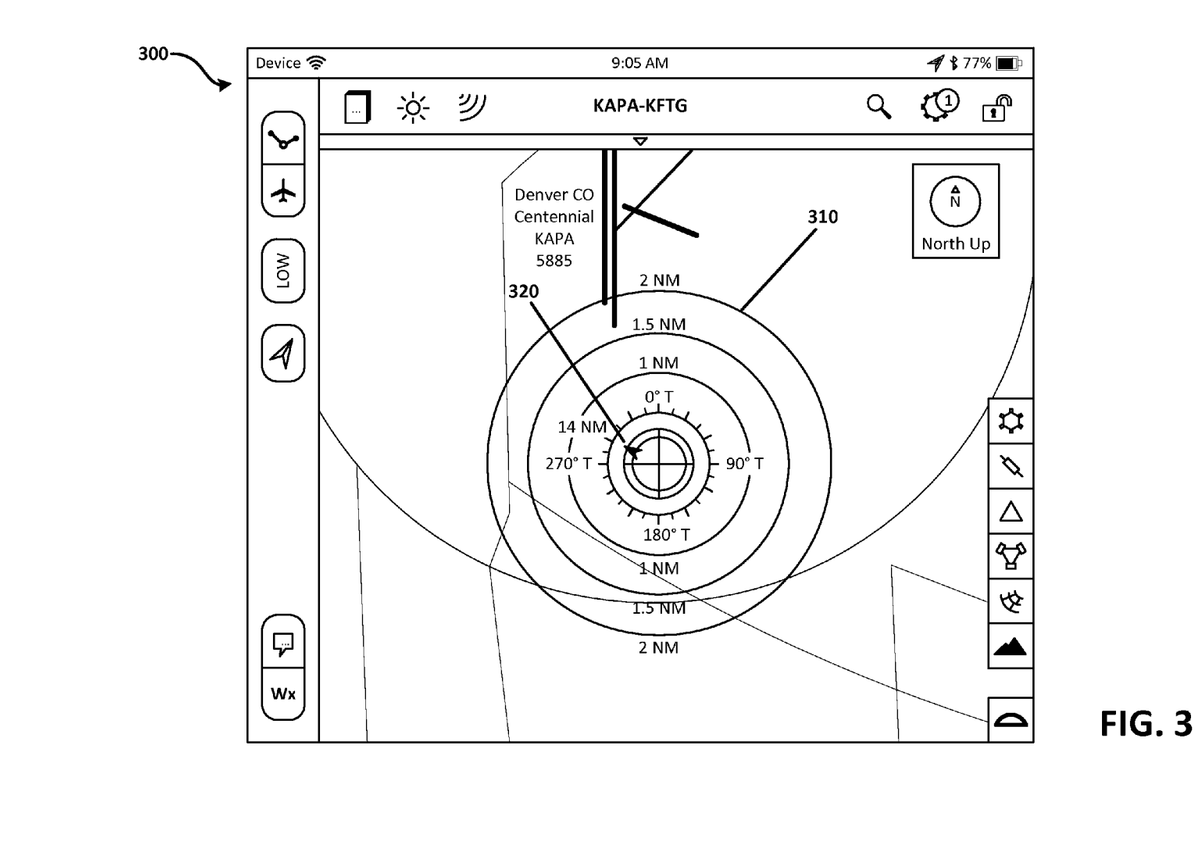
FIG. 3 depicts an example user interface that may be used in conjunction with presenting electronic map display information.

FIG. 3 illustrates an example map display 300 of an enroute distance measuring tool in accordance with this disclosure. FIG. 3 depicts range rings 310 with the ship offset indictor 320. As shown in the figure, ship offset indictor 320 appears at the map's reference point when the map is not centered on the aircraft's present position. The ship offset indictor 320 indicates the direction of the aircraft's position. The pilot or user may move the map and the ship offset indicator 320 may be continuously updated to indicate the direction of the aircraft's position.

Figure 4:
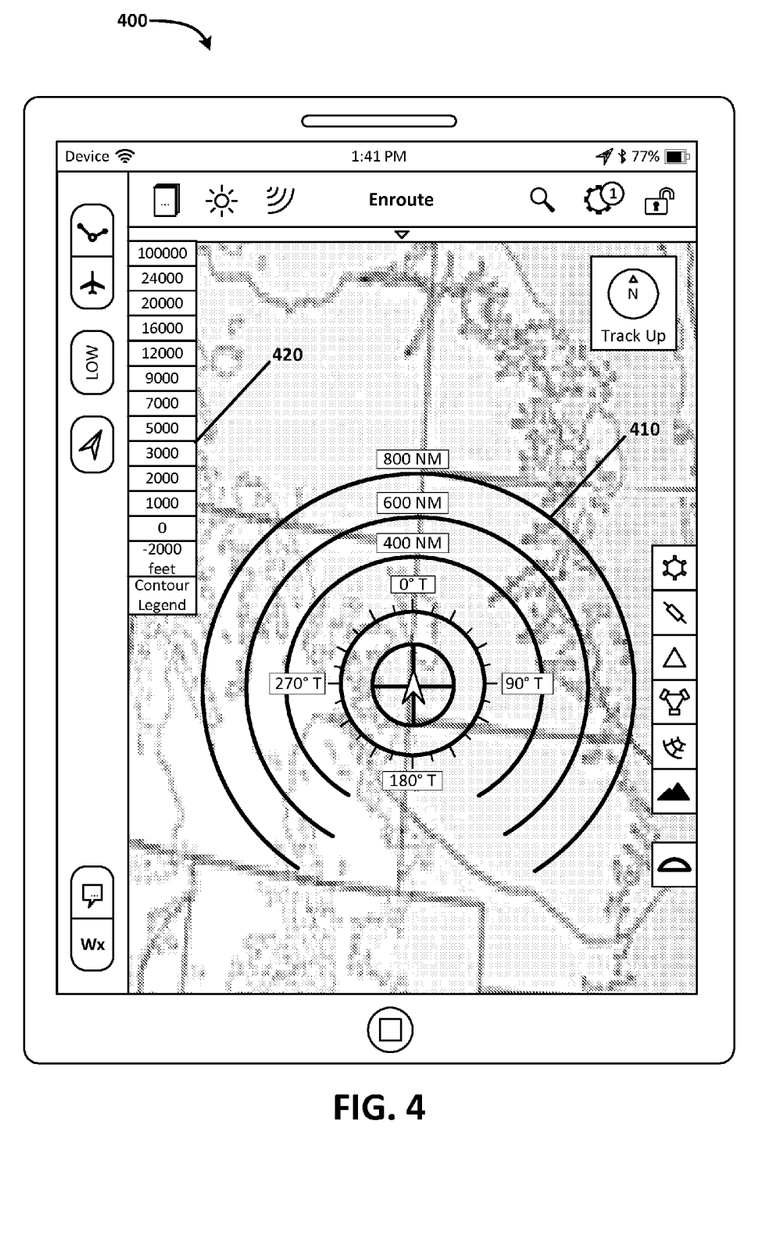
FIG. 4 illustrates an example user interface that may be used in conjunction with presenting electronic map display information.

FIG. 4 illustrates an example map display 400 of an enroute distance measuring tool in accordance with this disclosure. FIG. 4 depicts range rings 410 showing time intervals/ground speed 420. The time intervals/ground speed 420 may be continuously be updated as the map is updated due to changes in the aircraft position or due to changes based on user input.

Figure 5:
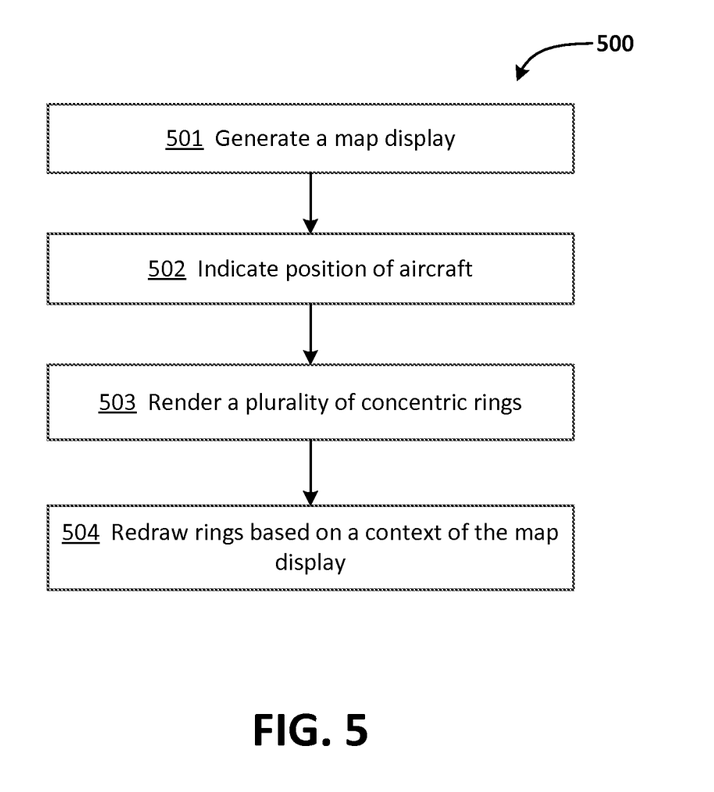
FIG. 5 depicts an example procedure for rendering electronic map display information e in accordance with this disclosure.

FIG. 5 illustrates an example operational procedure 500 for presenting electronic map display information. Referring to FIG. 5, operation 501 illustrates generating a map display comprising mapping data for a geographic region. Operation 501 may be followed by operation 502. Operation 502 illustrates indicating on the map display a position of the aircraft.

Operation 502 may be followed by operation 503. Operation 503 illustrates rendering on said map display a plurality of concentric rings. The concentric rings may be equally spaced from the center of the concentric rings. In one implementation, each of the rings may be indicative of a scaling factor for the mapping data. Additionally, the centermost of the concentric rings may be indicative of heading and orientation information. Based on a user input, the ownship indication may be positioned at the center of the concentric rings or can be offset from a center of the concentric rings. The map display may also indicate the distance of the ownship from the center.

The map display may be rendered with a north up orientation or a track up orientation, based on a user selection. The scaling factor can be indicative of distance or intervals of time, and can be set by user input. Depending on the mode, an indication to the direction of a position of the ownship may be rendered.

Operation 503 may be followed by operation 504. Operation 504 illustrates adjusting the concentric rings based on a context of said map display. This can include automatically adjusting the concentric rings when the operator zooms in or out. The rings can expand or contract as the map zooms in or out, and when the outermost ring reaches the edges of the display, the rings can be redrawn to the appropriate scale. In one implementation, the rings can be redrawn when the scaling changes to predefined scaling points.

The various examples used in this disclosure are described in the context of a commercial airline flight operation, but it should be understood that the described principles may be applied to any operational scenario where mapping data may be rendered on a device. Such examples in the field of transportation include airline, train, and cruise ship operations.

Figure 6:
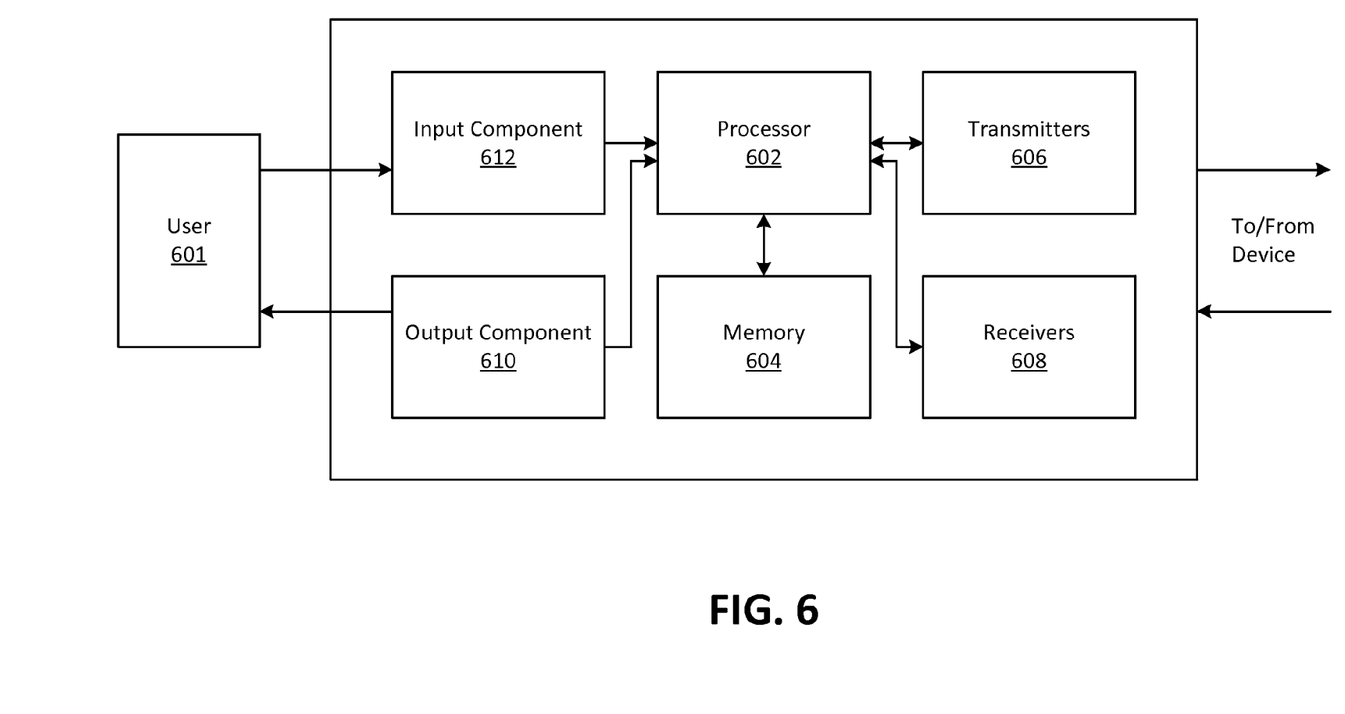
FIG. 6 is an example schematic diagram of a user device that may be used in conjunction with presenting electronic map display information.

FIG. 6 is an example schematic diagram of a user device that may be used in conjunction with an electronic map display. In one example, a user device may include a processor 602, a memory device 604 coupled to processor 602, one or more transmitters 606, one or more receivers 608, an output component 610, and an input component 612.

Processor 602 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are not intended to limit in any way the definition and/or meaning of the term "processor."

Memory device 604 includes a non-transitory computer-readable storage medium, such as, without limitation, random access memory (RAM), flash memory, a hard disk drive, a solid state drive, a diskette, a Flash drive, a compact disc, a digital video disc, and/or any suitable memory. In the exemplary implementation, memory device 604 includes data and/or instructions embodying aspects of the disclosure that are executable by processor 602 (e.g., processor 602 may be programmed by the instructions) to enable processor 602 to perform the functions described herein. Additionally, the memory device 604 may comprise an operation system and applications.

Transmitters 606 are configured to transmit control signals and data signals over a network. In one example, transmitters 606 may be wireless and transmit in a radio frequency spectrum and operate using an appropriate communication protocol.

Receivers 608 are configured to receive control signals and data signals over network. In one example, receivers 608 may be wireless and receive signals on a radio frequency spectrum using an appropriate communication pro.

The node may also include at least one output component 610 for presenting information to a user 601. Output component 610 may be any component capable of conveying information to user 601. In some implementations, output component 610 includes an output adapter, such as a video adapter and/or an audio adapter or the like. An output adapter is operatively coupled to processor 602 and is configured to be operatively coupled to an output device, such as a display device (e.g., a liquid crystal display (LCD), organic light emitting diode (OLED) display, cathode ray tube (CRT), "electronic ink" display, or the like) or an audio output device (e.g., a speaker, headphones, or the like). In some implementations, at least one such display device and/or audio device is included with output component 610.

The node may also include at least one input component 612 for receiving input from user 601. Input component 612 may include, for example, a keyboard, a pointing device, a mouse, a stylus, a touch sensitive panel (e.g., a touch pad or a touch screen), a gyroscope, an accelerometer, a position detector, an audio input device, or the like. A single component, such as a touch screen, may function as both an output device of output component 610 and input component 612. In some implementations, output component 610 and/or input component 612 include an adapter for communicating data and/or instructions between the node and a computer connected thereto.

It will be appreciated that, while various items are illustrated as being stored in memory or on storage while being used, these items or portions of them may be transferred between memory and other storage devices. Alternatively, in other examples some or all of the software modules and/or systems may execute in memory on another device and communicate with the illustrated computing systems via inter-computer communication. In some examples, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other examples. Accordingly, the present invention may be practiced with other computer system configurations.

In some examples, a system memory may be used, which is one example of a computer-readable storage medium configured to store program instructions and data as described above for FIGS. 1-6 for implementing examples of the corresponding methods and apparatus. However, in other examples, program instructions and/or data may be received, sent, or stored upon different types of computer-accessible media. Generally speaking, a computer-readable storage medium may include non-transitory and tangible storage media or memory media such as magnetic or optical media, e.g., disk or DVD/CD coupled to a computer system or gateway device. A computer-readable storage medium may also include any volatile or non-volatile media such as RAM (e.g., SDRAM, DDR SDRAM, RDRAM, SRAM, etc.), ROM, etc., that may be included in some examples of the computer systems described above as system memory, gateway device, or another type of memory. Portions or all of the multiple computer systems, such as those illustrated herein, may be used to implement the described functionality in various examples; for example, software components running on a variety of different devices and servers may collaborate to provide the functionality.

It will be appreciated that in some examples the functionality provided by the routines discussed above may be provided in alternative ways, such as being split among more routines or consolidated into fewer routines. Similarly, in some examples, illustrated routines may provide more or less functionality than is described, such as when other illustrated routines instead lack or include such functionality respectively or when the amount of functionality that is provided is altered. In addition, while various operations may be illustrated as being performed in a particular manner (e.g., in serial or in parallel) and/or in a particular order, in other examples the operations may be performed in other orders and in other manners. Similarly, the data structures discussed above may be structured in different ways in other examples, such as by having a single data structure split into multiple data structures or by having multiple data structures consolidated into a single data structure, and may store more or less information than is described (e.g., when other illustrated data structures instead lack or include such information respectively or when the amount or types of information that is stored is altered).

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. The example systems and components described herein may be configured differently than described. For example, elements may be added to, removed from, or rearranged compared to the disclosed examples.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

The invention claimed is:

1. A method for rendering a distance measuring tool pertaining to an aircraft on a display of a computing device, the method comprising:
   rendering, by the computing device on the display, a map comprising mapping data for a geographic region;
   receiving, by the computing device, a user input indicative of whether an aircraft indication should be positioned at a center or offset of the center of the map;
   in response to the user input, determining, by the computing device, a position of the aircraft on the display based on aircraft position and velocity information;
   indicating, by the computing device on the display, a position of the aircraft based on the determining;
   rendering, by the computing device on said display, a plurality of concentric rings or arcs, each of the rings or arcs indicative of a scaling factor for a measurement for said mapping data, wherein the position of the aircraft is rendered at the center or offset from the center of the plurality of concentric rings or arcs based on the user input, and wherein the concentric rings or arcs and the map may be moved relative to one another based on the user input;
   rendering, by the computing device on said display, a ship offset indicator indicating a direction of the aircraft from a reference point of the map when the map is moved and no longer centered on the position of the aircraft, wherein when the map is panned over an object of interest, the ship offset indicator is configured to point back to a direction of the position of the aircraft and wherein the plurality of concentric rings or arcs and the indicated position of the aircraft indicate a distance from the aircraft to the reference point of the map;
   determining, by the computing device, a change in a context of said display based on a change to the mapping data for the geographic region;
   adjusting, by the computing device, the plurality of concentric rings or arcs to indicate a corresponding change to the scaling factor for the measurement based on the changed context of said display, wherein as a user zooms the display in and out, the rings or arcs are configured to change with a map scale to provide continuous feedback of distance and direction regardless of a depicted map scale, and wherein the rings or arcs are updated automatically as position and altitude of the aircraft changes, wherein the adjusting comprises expanding or contracting the plurality of concentric rings or arcs when the display zooms in or out, and when an outermost ring or arc reaches edges of the display, redrawing the rings or arcs in accordance with the context determined by an appropriate scale determined when the map scale changes to a predefined scaling point; and
   updating the position of the aircraft at the center or offset from the center based on the corresponding change to the scaling factor.

2. The method of claim 1, the indicated position of the aircraft is indicative of heading and orientation information.

3. The method of claim 1, further comprising indicating a distance of the indicated position of the aircraft from the center.

4. The method of claim 1, wherein the plurality of concentric rings or arcs are equally spaced from a center of the concentric rings or arcs.

5. The method of claim 1, wherein the display is rendered with a north up orientation.

6. The method of claim 1, wherein the display is rendered with a track up orientation.

7. The method of claim 1, wherein a scaling factor of the plurality of concentric rings or arcs is indicative of one of distance or intervals of time.

8. The method of claim 1, further comprising rendering an indication to a direction of a position of the indicated position of the aircraft.

9. The method of claim 7, further comprising switching between distance and intervals of time based on a user input.

10. The method of claim 7, wherein the scaling factor is settable by a user input.

11. The method of claim 1, wherein the adjusting comprises expanding or contracting the plurality of concentric rings or arcs when the display zooms in or out, and when an outermost ring or arc reaches edges of the display, redrawing the rings or arcs in accordance with the context.

12. The method of claim 1, wherein the position of the aircraft is presented as a soft button which upon activation, returns the reference point of the map to the position of the aircraft in place of the ship offset indicator.

13. A device configured to provide a distance measuring tool, the device comprising at least a processor and memory, the memory having stored thereon computer-executable instructions that, when executed by the processor, cause the device to at least:
   cause generation of a map display comprising mapping data for a geographic region;
   receive a user input indicative of whether an aircraft indication should be positioned at a center or offset of the center of the map display;
   in response to the user input, determine a position of the aircraft on the map display based on aircraft position and velocity information;
   cause rendering on said map display a plurality of concentric rings, each of the rings indicative of a scaling factor for a measurement for said mapping data, wherein the position of the aircraft is rendered at the center or offset from the center of the plurality of concentric rings based on the user input, and wherein the concentric rings or arcs and the map may be moved relative to one another based on the user input;
   rendering, by the device on said display, a ship offset indicator indicating a direction of the aircraft from a reference point of the map when the map is moved and no longer centered on the position of the aircraft, wherein when the map is panned over an object of interest, the ship offset indicator is configured to point back to a direction of the position of the aircraft and wherein the plurality of concentric rings and the indicated position of the aircraft indicate a distance from the aircraft to the reference point of the map;
   determine, by the device, a change in a context of said map display based on a change to the mapping data for the geographic region;
   determine, by the device, a corresponding change to the scaling factor for the measurement based on the changed context;

adjust, on the map display, the scaling factor based on the determined corresponding change, wherein as a user zooms the map display in and out, the rings or arcs are configured to change with a map scale to provide continuous feedback of distance and direction regardless of a depicted map scale, and wherein the rings or arcs are updated automatically as position and altitude of the aircraft changes, wherein the adjusting comprises expanding or contracting the plurality of concentric rings or arcs when the display zooms in or out, and when an outermost ring or arc reaches edges of the display, redrawing the rings or arcs in accordance with the context determined by an appropriate scale determined when the map scale changes to a predefined scaling point; and update the position of the aircraft at the center or offset from the center based on the corresponding change to the scaling factor.

14. The device of claim 13, wherein the map display is rendered with a north up orientation or a track up orientation based on a user input.

15. The device of claim 13, wherein the position of the aircraft is presented as a soft button which upon activation, returns the reference point of the map to the position of the aircraft in place of the ship offset indicator.

16. A non-transitory computer-readable medium having computer-readable instructions stored thereon, the computer-readable instructions comprising instructions that upon execution on a computing system, at least cause:

generating a map display comprising mapping data for a geographic region;

receiving a user input indicative of whether an aircraft indication should be positioned at a center or offset of the center of the map display;

in response to the user input, determining a position of the aircraft on the display based on aircraft position and velocity information;

rendering on said map display a plurality of concentric rings, each of the rings indicative of a scaling factor for a measurement for said mapping data, wherein the position of the aircraft is rendered at the center or offset from the center of the plurality of concentric rings or arcs based on the user input, and wherein the concentric rings or arcs and the map may be moved relative to one another based on the user input;

determining a change in a context of said map display based on a change to the mapping data for the geographic region;

rendering, by the computing system on said display, a ship offset indicator indicating a direction of the aircraft from a reference point of the map when the map is moved and no longer centered on the position of the aircraft, wherein when the map is panned over an object of interest, the ship offset indicator is configured to point back to a direction of the position of the aircraft and wherein the plurality of concentric rings and the indicated position of the aircraft indicate a distance from the aircraft to the reference point of the map;

adjusting the scaling factor to indicate a corresponding change to the scaling factor for the measurement based on the changed context of said map display, wherein as a user zooms the display in and out, the rings or arcs are configured to change with a map scale to provide continuous feedback of distance and direction regardless of a depicted map scale, and wherein the rings or arcs are updated automatically as position and altitude of the aircraft changes, wherein the adjusting comprises expanding or contracting the plurality of concentric rings or arcs when the display zooms in or out, and when an outermost ring or arc reaches edges of the display, redrawing the rings or arcs in accordance with the context determined by an appropriate scale determined when the map scale changes to a predefined scaling point; and updating the position of the aircraft at the center or offset from the center based on the corresponding change to the scaling factor.

17. The non-transitory computer-readable medium of claim 16, further comprising instructions that upon execution on a computing system, at least cause switching between distance and intervals of time based on a user input.

18. The non-transitory computer-readable medium of claim 16, wherein the scaling factor is indicative of one of distance or intervals of time based on a user input.

19. The computer-readable medium of claim 16, wherein the position of the aircraft is rendered as a soft button which upon activation, returns the reference point of the map to the position of the aircraft in place of the ship offset indicator.

* * * * *